US008417291B2

(12) United States Patent
Lim

(10) Patent No.: US 8,417,291 B2
(45) Date of Patent: Apr. 9, 2013

(54) METHOD AND APPARATUS FOR MANAGING PHONEBOOK IN A PORTABLE TERMINAL

(75) Inventor: Mi-Young Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 12/856,893

(22) Filed: Aug. 16, 2010

(65) Prior Publication Data
US 2011/0039530 A1 Feb. 17, 2011

(30) Foreign Application Priority Data

Aug. 17, 2009 (KR) ........................ 10-2009-0075690

(51) Int. Cl.
H04M 1/00 (2006.01)
(52) U.S. Cl. ............... 455/556.2; 455/412.1; 455/414.1; 455/566

(58) Field of Classification Search ............... 455/412.1, 455/414.1, 415, 412, 566, 434, 435.1, 412.2, 455/556.1, 557, 432.3
See application file for complete search history.

(56) References Cited

U.S. PATENT DOCUMENTS

| 2006/0136561 | A1* | 6/2006 | Lee | 709/206 |
| 2007/0167153 | A1* | 7/2007 | Cho et al. | 455/414.1 |
| 2008/0218490 | A1* | 9/2008 | Kim et al. | 345/173 |
| 2008/0254783 | A1* | 10/2008 | Kim et al. | 455/418 |
| 2009/0074171 | A1* | 3/2009 | Lee | 379/218.01 |
| 2009/0325647 | A1* | 12/2009 | Cho et al. | 455/567 |

* cited by examiner

Primary Examiner — Jean Gelin
(74) Attorney, Agent, or Firm — Jefferson IP Law, LLP

(57) ABSTRACT

A method and apparatus for managing a phone book in a portable terminal are provided. The method includes determining whether at least one of a message and a call is generated for a phone number registered to the phone book, storing information on the at least one of the message and the call by mapping to the phone number and displaying the stored information together when the phone number registered to the phone book is displayed.

16 Claims, 5 Drawing Sheets

METHOD AND APPARATUS FOR MANAGING PHONEBOOK IN A PORTABLE TERMINAL

PRIORITY

This application claims the benefit under 35 U.S.C. §119(a) of a Korean patent application filed in the Korean Intellectual Property Office on Aug. 17, 2009 and assigned Serial No. 10-2009-0075690, the entire disclosure of which is hereby incorporated by reference.

BACKGROUND OF THE INVENTION

1. Field of the Invention

The present invention relates to a method and apparatus for managing a phone book in a portable terminal. More particularly, the present invention relates to a method and apparatus for indicating information on a message or call transmitted or received with respect to a recipient terminal in a phone book.

2. Description of the Related Art

A portable terminal provides a phone book for storing a phone number required in business or personal life of a user and a variety of information related to the phone number (e.g., a name, a photo, an e-mail address, an extra phone number, an address, an adversary, a group, etc.) and for performing an association function by using a corresponding phone number through search. The phone book provides a function of managing a phone number list of a recipient for each group in order to allow a user to manage personal contacts, and also provides an association function capable of transmitting and receiving a call, a Short Message Service (SMS), a Multimedia Message Service (MMS), etc., with respect to a phone number selected from the phone book. However, it has been difficult for the user to effectively manage the personal contacts by using only the aforementioned functions. That is, tens or hundreds of phone numbers may be input to the phone book according to the personal contacts of the user, and the greater the number of phone numbers input to the phone book, the more difficult it becomes for the user to remember when and in what matter the contact is made to the recipient. Further, although the contact made to the recipient can be recognized by using a message or call record, the number of message or call records that can be stored is less than a specific number. Therefore, there is a problem in that a message or call record for a contact that was made a long time ago does not remain.

SUMMARY OF THE INVENTION

An aspect of the present invention is to address at least the above-mentioned problems and/or disadvantages and to provide at least the advantages described below. Accordingly, an aspect of the present invention is to provide a method and apparatus for managing a phone book in a portable terminal.

Another aspect of the present invention is to provide a method and apparatus for indicating information on a message and call transmitted and received with respect to a recipient terminal in a phone book in a portable terminal.

Another aspect of the present invention is to provide a method and apparatus for indicating information on a contact record for respective phone numbers in a phone book.

In accordance with an aspect of the present invention, a method of managing a phone book in a portable terminal is provided. The method includes determining whether at least one of a message and a call is generated for a phone number registered to the phone book, storing information on the at least one of the message and the call by mapping to the phone number, and displaying the stored information together when the phone number registered to the phone book is displayed.

In accordance with another aspect of the present invention, an apparatus for managing a phone book in a portable terminal is provided. The apparatus includes a controller for determining whether at least one of a message and a call is generated for a phone number registered to the phone book, a storage unit for storing information on the at least one of the message and the call by mapping to the phone number under the control of the controller, and a display unit for displaying the stored information on the at least one of the message and the call when the phone number registered to the phone book is displayed under the control of the controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a method and apparatus for indicating a call record for respective phone numbers in a phone book in a portable terminal will be described.

Figure 1:
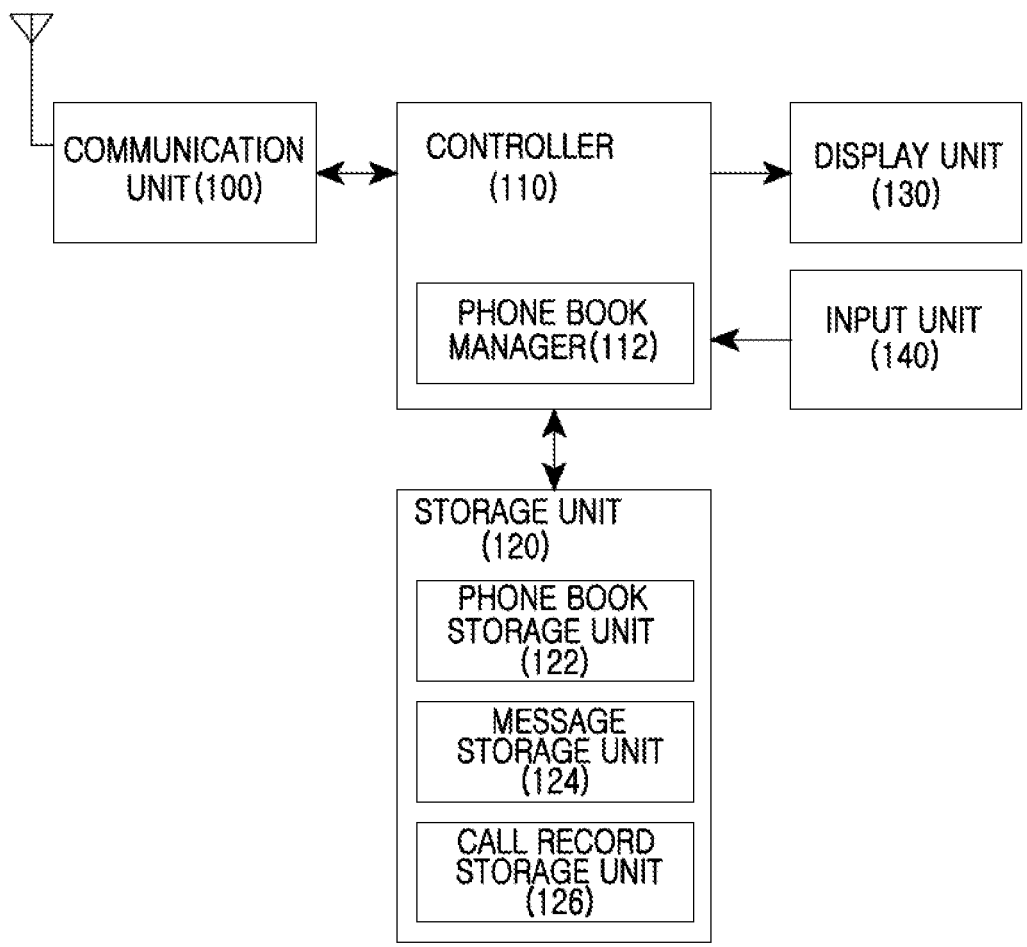
FIG. 1 is a block diagram illustrating a portable terminal according to an exemplary embodiment of the present invention.

FIG. 1 is a block diagram illustrating a portable terminal according to an exemplary embodiment of the present invention.

Referring to FIG. 1, the portable terminal includes a communication unit 100, a controller 110, a storage unit 120, a display unit 130, and an input unit 140. The controller 110 includes a phone book manager 112. The storage unit 120 includes a phone book storage unit 122, a message storage unit 124, and a call record storage unit 126.

The communication unit 100 performs a function of transmitting and receiving a radio signal of data which is input and output through an antenna. In particular, the communication unit 100 performs a function of transmitting and receiving a signal depending on message transmission and reception or a call connection under the control of the controller 110.

The controller 110 controls and processes overall operations of the portable terminal. Further, the controller 110 includes the phone book manager 112 to control and process a function of recording contact information for respective phone numbers registered to a phone book, i.e., a transmission and reception message or call information. That is, when the transmission and reception message or call for the phone number registered to the phone book storage unit 122 is generated, the phone book manager 112 controls and processes a function of mapping the generated message or call information to the corresponding phone number and storing the result obtained by mapping to the phone book storage unit 122. In this case, when a message mapped to a corresponding phone number of call information is pre-stored in the phone book storage unit 122, the phone book storage unit 122 controls and processes a function of deleting the pre-stored information, mapping a newly generated message or call information to the corresponding phone number, and storing the result obtained by mapping. That is, the phone book manager 112 allows only the last generated message and call information for the corresponding phone number to be stored in the phone book storage unit 122. Further, the phone book manager 112 may allow the last generated message and call information for the corresponding phone number to be stored for each of transmission and reception operations, and may allow only information on one or a specific number of last generated messages and calls to be stored irrespective of the transmission and reception operations. Herein, the message information includes a message content and a message transmission/reception date and time, and the call information includes a call generation time and a call time duration.

The storage unit 120 stores data and a variety of programs for overall operations of the portable terminal. The storage unit 120 stores each user's phone number and related information (e.g., a name, a group, a birthday, a mail address, a photo, etc.) in the phone book storage unit 122. In particular, the storage unit 120 stores a message and call information generated for each user's phone number under the control of the phone book manager 112. Further, the storage unit 120 stores the transmitting and reception message and call information in each of the message storage unit 124 and the call record storage unit 126. In this case, the number of the transmission and reception messages and calls to be stored may be limited according to a configuration. Although it is described herein that the message and call information generated for each user's phone number is stored in the phone book storage unit 122, the message and call information may be stored in another area of a memory in addition to the phone book storage unit 122. If an event for deleting a message or call record is generated and thus the message or call information stored in the message storage unit 124 or the call record storage unit 126 is deleted, the message and call information mapped to the phone number and stored in the phone book storage unit 122 or in another memory area is not deleted. The reason above is to show the phone number and the exchanged contact information when an event for viewing information on the phone number from the phone book by allowing the message and call information mapped to the phone number to remain even if the message or call record is deleted due to a manipulation of the user or shortage of a storage space of the message storage unit 124 and the call record storage unit 126.

Figure 2:
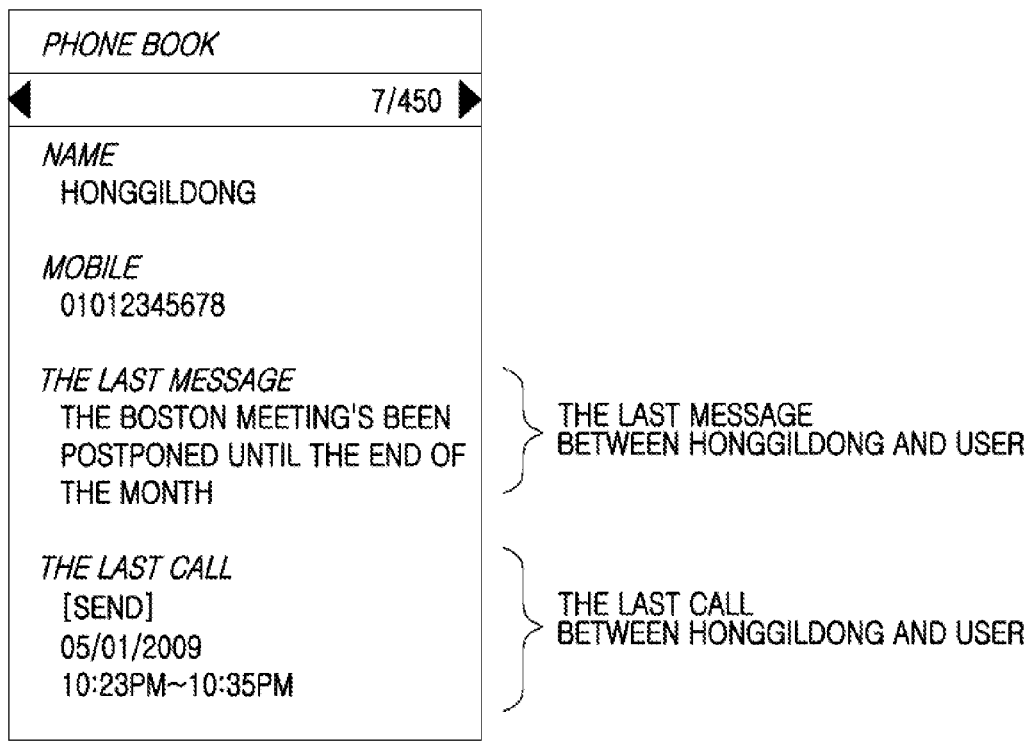
FIG. 2 illustrates a phone book screen including a message and call record in a portable terminal according to an exemplary embodiment of the present invention.

The display unit 130 displays state information and alphanumeric characters which are generated while the portable terminal operates. In particular, when an event for viewing information on a specific user registered to the phone book is generated, the display unit 130 receives a phone number and related information on the specific user and also a transmission and reception message or call information from the phone book storage unit 122 under the control of the controller 110, and then displays the received information. For example, as illustrated in FIG. 2, the display unit 130 displays a phone number, a name, a message transmitted and received with respect to the phone number, and call information.

The input unit 140 has a plurality of function keys to provide data corresponding to a key pressed by the user to the controller 110.

Figure 3:
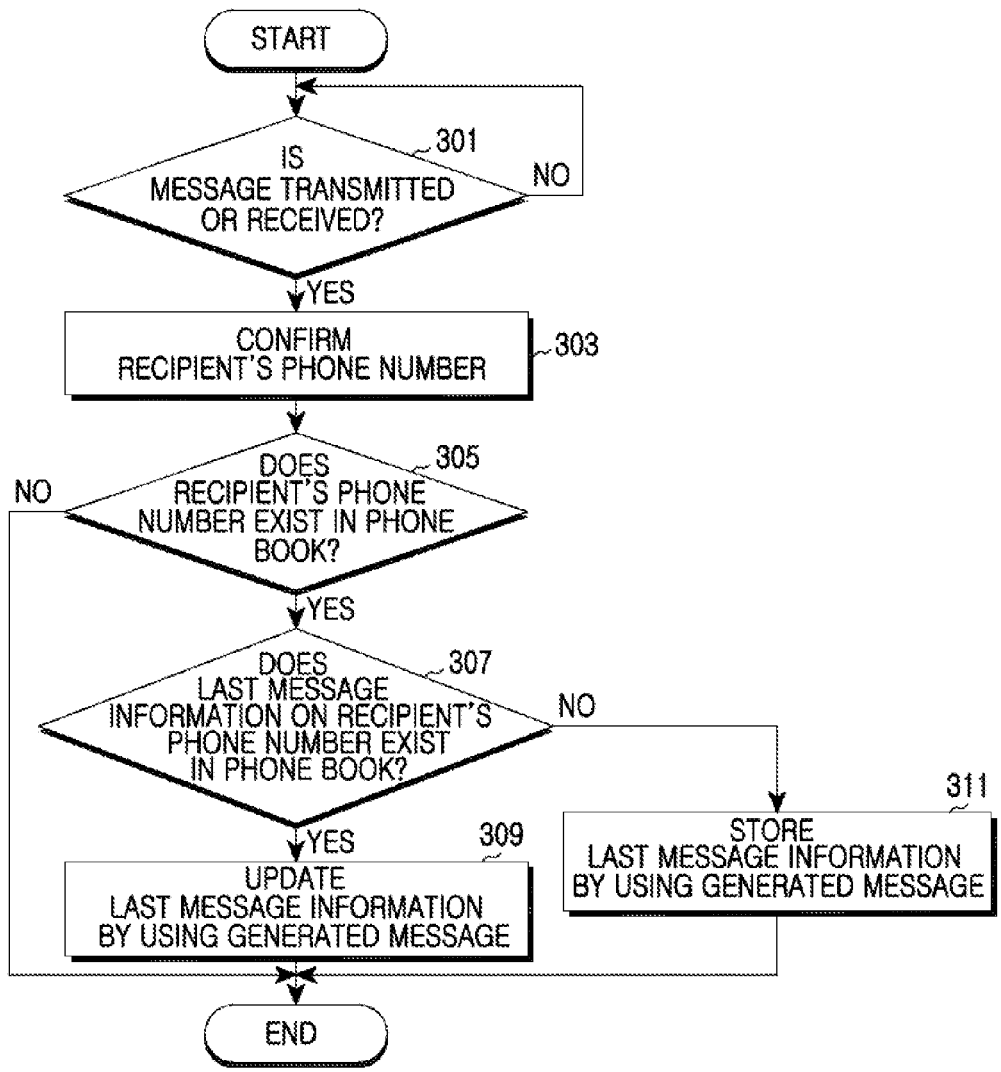
FIG. 3 is a flowchart illustrating a process of recording message information into a phone book in a portable terminal according to an exemplary embodiment of the present invention.

FIG. 3 is a flowchart illustrating a process of recording message information into a phone book in a portable terminal according to an exemplary embodiment of the present invention.

Referring to FIG. 3, if a message is transmitted or received in step 301, the portable terminal confirms a recipient's phone number for the message in step 303, and determines whether the confirmed recipient's phone number is a phone number registered to the phone book in step 305. If it is determined that the recipient's phone number is a phone number not registered to the phone book, the procedure of FIG. 3 ends.

In contrast, if it is determined in step 305 that the recipient's phone number is the phone number registered to the phone book, the portable terminal determines whether last message information mapped to the recipient's phone number is stored in the phone book in step 307. Herein, the message information includes a message content and a message transmission and reception date and time.

If it is determined in step 307 that the last message information on the recipient's phone number is stored in the phone book, the portable terminal deletes the last message information previously stored, and stores information on the message transmitted or received by mapping the information to the recipient's phone number in step 309. Thereafter, the procedure of FIG. 3 ends.

In contrast, if it is determined in step 307 that the last message information on the recipient's phone number is not stored in the phone book, the portable terminal stores the information on the message transmitted or received by mapping the information to the recipient's phone number in step 311. Thereafter, the procedure of FIG. 3 ends.

Although information on one message last generated is mapped to a corresponding phone number and is stored irrespective of whether the message is a transmission message or a reception message, information on the message may be stored for each of the transmission message and the reception message. That is, information on a last transmitted message and information on a last received message may be stored for a corresponding phone number. In addition, although it is described herein that only information on one message last generated is mapped to the corresponding phone number and is stored, information on a plurality of messages may be stored according to a configuration of a user or a designer.

Figure 4:
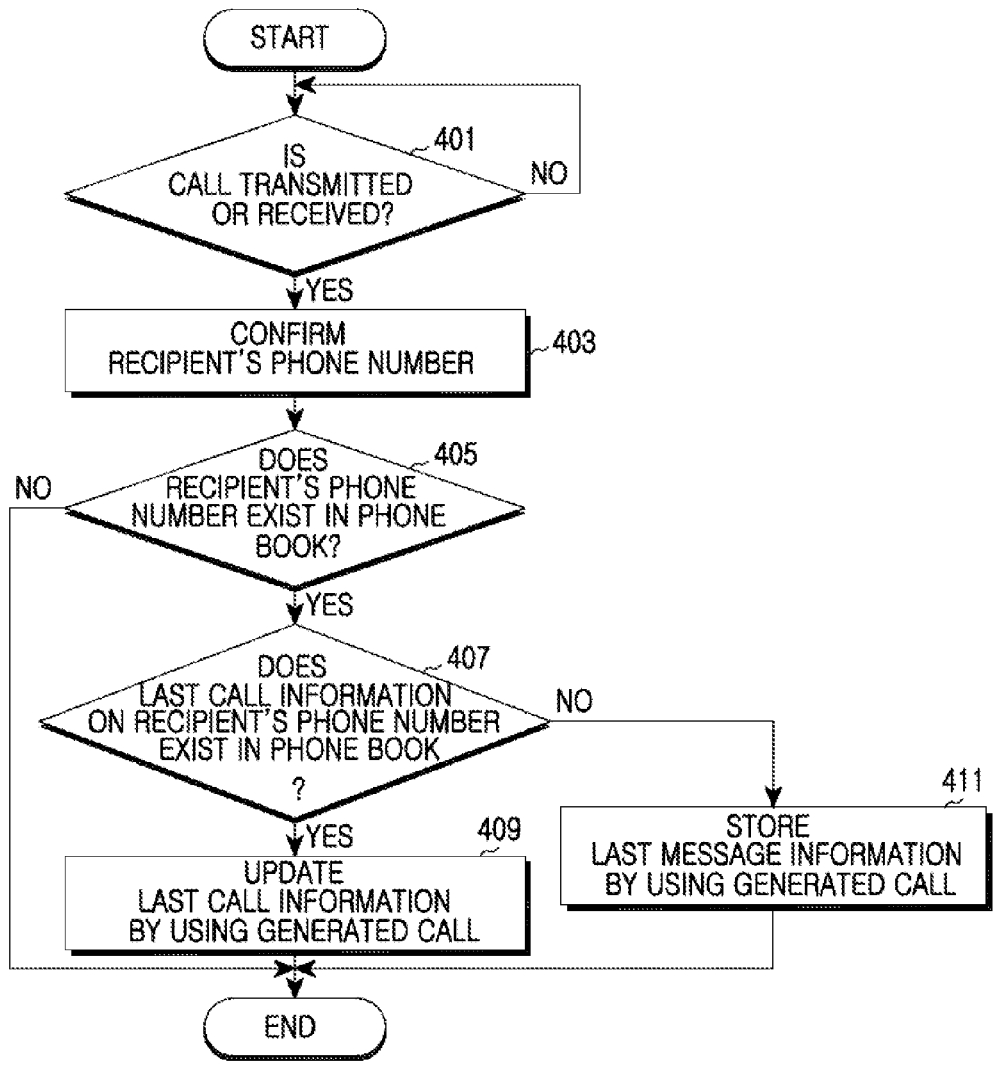
FIG. 4 is a flowchart illustrating a process of recording call information into a phone book in a portable terminal according to an exemplary embodiment of the present invention.

FIG. 4 is a flowchart illustrating a process of recording call information into a phone book in a portable terminal according to an exemplary embodiment of the present invention.

Referring to FIG. 4, when a call is transmitted or received in step 401, the portable terminal confirms a recipient's phone number for that call in step 403, and determines whether the confirmed recipient's phone number is a phone number registered to the phone book in step 405. If it is determined in step 405 that the recipient's phone number is a phone number not registered to the phone book, the procedure of FIG. 4 ends.

In contrast, if it is determined in step 405 that the recipient's phone number is the phone number registered to the phone book, the portable terminal determines whether last phone information mapped to the recipient's phone number is stored in the phone book in step 407. The call information includes a call generation time and a call time period.

If it is determined in step 407 that the last call information on the recipient's call information is stored in the phone book, the portable terminal deletes the last call information previously stored, and stores information on a call transmitted or received by mapping the information to the recipient's phone number in step 409. Thereafter, the procedure of FIG. 4 ends.

In contrast, if it is determined in step 407 that the last communication information on the recipient's phone number is not stored in the phone book, the portable terminal stores information on the call transmitted or received by mapping the information to the recipient's phone number in step 411. Thereafter, the procedure of FIG. 4 ends.

Although information on one call last generated is mapped to a corresponding phone number and is stored irrespective of whether the call is a transmission call or a reception call, information on the call may be stored for each of the transmission call and the reception call. That is, information on a last transmitted call and information on a last received call may be stored for a corresponding phone number. In addition, although it is described herein that only information on one call last generated is mapped to the corresponding phone number and is stored, information on a plurality of calls may be stored according to a configuration of a user or a designer.

Figure 5:
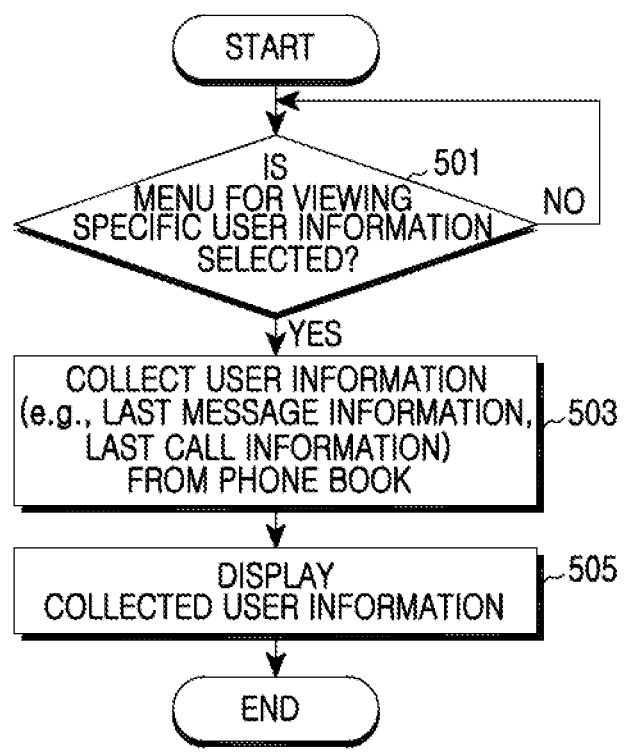
FIG. 5 is a flowchart illustrating a process of displaying a phone book in a portable terminal according to an exemplary embodiment of the present invention.

FIG. 5 is a flowchart illustrating a process of displaying a phone book in a portable terminal according to an exemplary embodiment of the present invention.

Referring to FIG. 5, when a menu for viewing information of a specific user is selected among users registered to the phone book in step 501, the portable terminal collects information on that user from the phone book in step 503. That is, the portable terminal collects a corresponding user's phone number and related information (e.g., a name, a group, a birthday, a mail address, and a photo) from the phone book, and last message information and last call information generated for the phone number of the corresponding user.

In step 505, the portable terminal displays the collected user's information. For example, as illustrated in FIG. 2, the corresponding user's phone number and name and the last transmitted and received message and call information are displayed.

Thereafter, the procedure of FIG. 5 ends.

According to exemplary embodiments of the present invention, a portable terminal displays information on a contact record for respective phone numbers, i.e., a message and a call record. Therefore, when and in what content the contact is made to a recipient of each phone number may be easily known, thereby further effectively managing personal connections.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of managing a phone book in a portable terminal, the method comprising:
   determining whether at least one of a message and a call is generated for a phone number registered to the phone book;
   storing information on the at least one of the message and the call by mapping to the phone number; and
   displaying the stored information together when the phone number registered to the phone book is displayed
   wherein the storing of the information on the at least one of the message and the call by mapping to the phone number comprises:
   determining whether the information on the at least one of the message and the call for the phone number is pre-stored;
   if it is determined that the information on the at least one of the message and the call for the phone number is pre-stored, deleting all the pre-stored information associated with the phone number; and
   storing the information on the at least one of the message and the call by mapping to the phone number.

2. The method of claim 1, wherein the information on the at least one of the message and the call comprises at least one of a message content, a message transmission and reception date and time, and a call generation time and call time.

3. The method of claim 1, wherein the information on the at least one of the message and the call comprises information on a specific number of messages or calls.

4. The method of claim 1, wherein the information on the at least one of the message and the call is stored by mapping to the phone number for each of transmission and reception.

5. The method of claim 1, wherein the information on the at least one of the message and the call and which is mapped to the phone number is stored in the phone book.

6. The method of claim 1, wherein the displaying of the stored information together includes displaying a caller name, the phone number, and at least one of the last message, and the date and the time of the last call information.

7. An apparatus for managing a phone book in a portable terminal, the apparatus comprising:
   a controller for determining whether at least one of a message and a call is generated for a phone number registered to the phone book;
   a storage unit for storing information on the at least one of the message and the call by mapping to the phone number under the control of the controller; and
   a display unit for displaying the stored information on the at least one of the message and the call when the phone number registered to the phone book is displayed under the control of the controller
   wherein, if the information on the at least one of the message and the call for the phone number is pre-stored in the storage unit, the controller deletes all the pre-stored information associated with the phone number, and stores the information on the at least one of the message and the call by mapping to the phone number.

8. The apparatus of claim 7, wherein the information on the at least one of the message and the call comprises at least one of a message content, a message transmission and reception date and time, and a call generation time and call time.

9. The apparatus of claim 7, wherein the storage unit maps information on a specific number of messages or calls to the phone number.

10. The apparatus of claim 7, wherein the storage unit stores the information on the at least one of the message and the call by mapping to the phone number for each of transmission and reception.

11. The apparatus of claim 7, wherein the storage unit stores the information on the at least one of the message and the call and which is mapped to the phone number in the phone book.

12. A non-transitory computer-readable recording medium having recorded thereon a program for a portable terminal, the non-transitory computer-readable recording medium comprising:
   a first code segment for determining whether at least one of a message and a call is generated for a phone number registered to the phone book;
   a second code segment for storing information on the at least one of the message and the call by mapping to the phone number; and
   a third code segment for displaying the stored information together when the phone number registered to the phone book is displayed;
   wherein the second code segment for storing of the information comprises:
      a fourth code segment for determining whether the information on the at least one of the message and the call for the phone number is pre-stored;
      a fifth code segment for, if it is determined that the information on the at least one of the message and the call for the phone number is pre-stored, deleting all the pre-stored information associated with the phone number; and
      a sixth code segment for storing the information on the at least one of the message and the call by mapping to the phone number.

13. The non-transitory computer-readable recording medium of claim 12, wherein the information on the at least one of the message and the call comprises at least one of a message content, a message transmission and reception date and time, and a call generation time and call time.

14. The non-transitory computer-readable recording medium of claim 12, wherein information on a specific number of messages or calls is mapped to the phone number.

15. The non-transitory computer-readable recording medium of claim 12, wherein the information on the at least one of the message and the call comprises information on a specific number of messages or calls.

16. The non-transitory computer-readable recording medium of claim 12, wherein the information on the at least one of the message and the call and which is mapped to the phone number is stored in the phone book.

* * * * *